US012109941B1

(12) United States Patent
Mazuir et al.

(10) Patent No.: US 12,109,941 B1
(45) Date of Patent: Oct. 8, 2024

(54) WINDOWS WITH PHOTOLUMINESCENT LIGHTING

(71) Applicant: Apple Inc., Cupertino, CA (US)

(72) Inventors: Clarisse Mazuir, San Jose, CA (US); David E Kingman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/748,946

(22) Filed: May 19, 2022

Related U.S. Application Data

(60) Provisional application No. 63/231,665, filed on Aug. 10, 2021.

(51) Int. Cl.
*B60Q 3/208* (2017.01)
*B32B 17/10* (2006.01)
(Continued)

(52) U.S. Cl.
CPC ................ *B60Q 3/208* (2017.02); *B60J 1/20* (2013.01); *B60Q 3/64* (2017.02); *B60Q 3/74* (2017.02); *B32B 17/10541* (2013.01); *B60Q 1/268* (2013.01); *B60Q 3/68* (2017.02); *F21S 43/16* (2018.01); *G02B 6/0003* (2013.01); *G02B 6/0063* (2013.01); *G02B 6/0095* (2013.01)

(58) Field of Classification Search
CPC ......... F21S 43/16; B60Q 1/268; B60Q 3/208; B60Q 3/68; B32B 17/10541; G02B 6/0003; G02B 6/0063; G02B 6/0095
See application file for complete search history.

(56) References Cited

U.S. PATENT DOCUMENTS 3,711,700 A * 1/1973 Westlund, Jr. et al. ... F21V 9/08 600/249
5,515,254 A * 5/1996 Smith ..................... F21V 29/74 362/333

(Continued)

FOREIGN PATENT DOCUMENTS

CN 105937748 A * 9/2016 ............... B60Q 1/32
WO WO-2005100088 A2 * 10/2005 ............. F21S 41/43

(Continued)

OTHER PUBLICATIONS

Machine translation of WO 2020189782 A1 retrieved from the FIT database of PE2E search. (Year: 2024).*

(Continued)

*Primary Examiner* — Colin J Cattanach
(74) *Attorney, Agent, or Firm* — Treyz Law Group, P.C.; G. Victor Treyz; Kendall P. Woodruff

(57) ABSTRACT

A system may have a window. The window may have a waveguide that includes photoluminescent material such as a phosphor layer. The waveguide may have a waveguide core surrounded by cladding layers. The waveguide may be located between an outer structural glass layer and an inner structural glass layer. A light source such as an ultraviolet light source provides pump light to one or more edges the waveguide. The pump light is guided within the waveguide and excites the photoluminescent material. This causes the photoluminescent material to luminesce and create visible light illumination. The visible light illumination may be used to light up an interior region of the system.

13 Claims, 3 Drawing Sheets

22 14 40 42 44 46 48 50 52 54 30 32 36 34 34 20 Z Y X

(51) Int. Cl.

| | |
|---|---|
| ***B60J 1/20*** | (2006.01) |
| ***B60Q 1/26*** | (2006.01) |
| ***B60Q 3/64*** | (2017.01) |
| ***B60Q 3/68*** | (2017.01) |
| ***B60Q 3/74*** | (2017.01) |
| ***F21S 43/16*** | (2018.01) |
| ***F21V 8/00*** | (2006.01) |

(56) References Cited

U.S. PATENT DOCUMENTS

| | | | | |
|---|---|---|---|---|
| 8,072,686 | B2 | 12/2011 | Cui et al. | |
| 9,315,148 | B2 | 4/2016 | Schwenke et al. | |
| 9,568,659 | B2 | 2/2017 | Verger et al. | |
| 9,845,047 | B1 * | 12/2017 | Salter | B60Q 1/268 |
| 9,864,125 | B2 | 1/2018 | Gierens et al. | |
| 9,902,314 | B1 | 2/2018 | Salter et al. | |
| 10,048,560 | B1 * | 8/2018 | Mazuir | G02F 1/137 |
| 10,114,166 | B2 | 10/2018 | Berard et al. | |
| 10,202,075 | B2 | 2/2019 | Lefevre et al. | |
| 10,286,839 | B1 * | 5/2019 | Mazuir | F21V 9/20 |
| 2003/0206414 | A1 * | 11/2003 | Wood | F21V 9/08 362/280 |
| 2006/0209551 | A1 * | 9/2006 | Schwenke | B60Q 3/208 362/503 |
| 2014/0355106 | A1 * | 12/2014 | Laluet | B32B 17/10761 359/359 |
| 2018/0368217 | A1 * | 12/2018 | Toft | F21S 10/02 |
| 2021/0116630 | A1 * | 4/2021 | Wang | G02B 6/004 |
| 2021/0131638 | A1 * | 5/2021 | Sato | F21S 45/70 |
| 2022/0149019 | A1 * | 5/2022 | Brandl | F21S 43/15 |

FOREIGN PATENT DOCUMENTS

| | | | | |
|---|---|---|---|---|
| WO | WO-2013003894 | A1 * | 1/2013 | B32B 17/10036 |
| WO | WO-2019094285 | A1 * | 5/2019 | B32B 17/10036 |
| WO | WO-2020189782 | A1 * | 9/2020 | B32B 17/10036 |

OTHER PUBLICATIONS

Machine translation of CN 105937748 A retrieved from the FIT database of PE2E search. (Year: 2024).*

Machine translation of WO 2013003894 A1 retrieved from the FIT database of PE2E search. (Year: 2024).*

* cited by examiner

WINDOWS WITH PHOTOLUMINESCENT LIGHTING

This application claims the benefit of provisional patent application No. 63/231,665, filed Aug. 10, 2021, which is hereby incorporated by reference herein in its entirety.

FIELD

This relates generally to structures that pass light, and, more particularly, to windows.

BACKGROUND

Windows are used in buildings and vehicles. Windows may be formed from glass or other transparent material.

SUMMARY

A system such as a building or vehicle may have windows. The windows may be used in separating an interior region of the system from an exterior region surrounding the system.

A window in the system may have a waveguide that includes photoluminescent material such as a phosphor layer. The waveguide may have a waveguide core surrounded by cladding layers. The waveguide may be located between an outer structural glass layer and an inner structural glass layer.

A light source such as an ultraviolet light source provides pump light to the waveguide core. The pump light is guided within the waveguide and excites the photoluminescent material. This causes the photoluminescent material to luminesce and create visible light illumination. The visible light illumination may be used to light up the interior region of the system.

The window may be provided with structures that adjust the color of the visible light illumination. For example, the phosphor layer may produce yellowish light and the window may have blue colorant or a thin-film interference filter that imparts a bluish color cast to help compensate for the yellowish light (e.g., by making the yellowish light less yellow in appearance).

DETAILED DESCRIPTION

A system may have one or more windows or other transparent structures. The windows may have photoluminescent material. The photoluminescent material may be pumped by light sources such as light-emitting diodes. In response, the photoluminescent material may luminesce. Emitted light from the photoluminescent material may be used as a source of illumination. For example, an area of photoluminescent material may be configured to emit light that serves as interior illumination for an interior region of the system.

The system in which the windows are used may be a building, a vehicle, or other suitable system. Illustrative configurations in which the system is a vehicle may sometimes be described herein as an example. This is merely illustrative. Window structures may be formed in any suitable systems.

Figure 1:
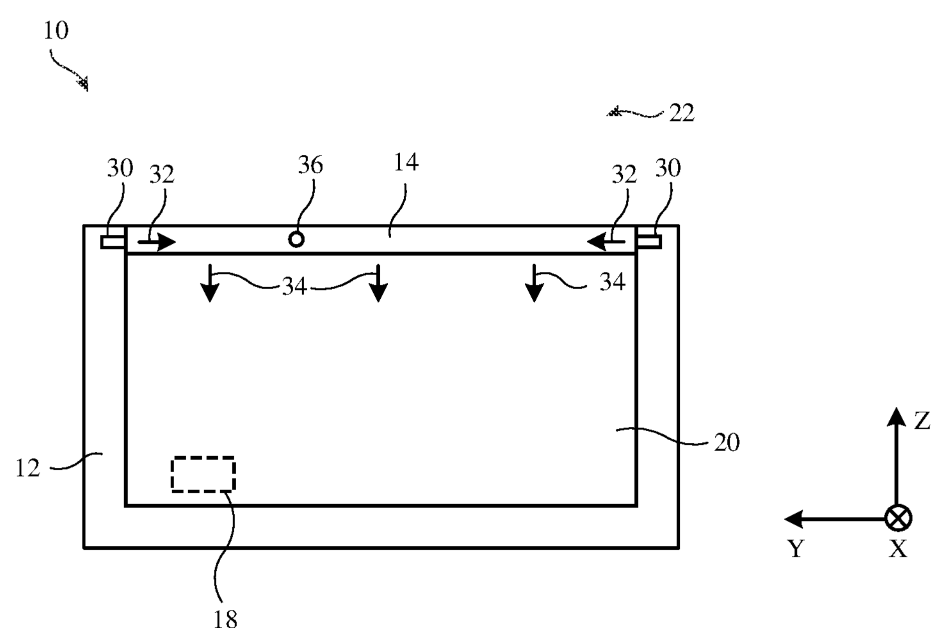
FIG. 1 is a diagram of an illustrative system with windows in accordance with an embodiment.

A cross-sectional side view of an illustrative system that includes windows is shown in FIG. 1. System 10 may be a vehicle, building, or other type of system. In an illustrative configuration, system 10 is a vehicle. As shown in the illustrative side view of system 10 in FIG. 1, system 10 may have support structures such as body 12. Body 12 may be a vehicle body that includes doors, trunk structures, a hood, side body panels, a roof, window pillars, and/or other body structures. Body 12 may be configured to surround and enclose an interior region such as interior region 20.

One or more windows such as windows 14 may be mounted within openings in body 12. Windows 14 may, for example, be mounted on the front of body 12 (e.g., to form a front window on the front of a vehicle), on the rear of body 12 (e.g., to form a rear window at the rear of a vehicle), on the top of body 12 (e.g., to form a sun roof as shown in the example of FIG. 1), and/or on sides of body 12 (e.g., to form side windows). Windows 14 (e.g., front and rear windows) may include windows that are fixed in place and/or may include windows that can be manually and/or automatically rolled up or down. For example, one or more windows 14 may be controlled using window positioners (e.g., window motors that open and close windows 14 in response to user input or other input). The area of each window 14 may be at least 0.1 $m^2$, at least 0.5 $m^2$, at least 1 $m^2$, at least 5 $m^2$, at least 10 $m^2$, less than 20 $m^2$, less than 10 $m^2$, less than 5 $m^2$, or less than 1.5 $m^2$ (as examples). Windows 14 and portions of body 12 may be used to separate interior region 20 from the exterior environment that is surrounding system 10 (exterior region 22).

System 10 may include a chassis to which wheels are mounted, may include propulsion and steering systems, and may include a vehicle automation system configured to support autonomous driving (e.g., a vehicle automation system with sensors and control circuitry configured to operate the propulsion and steering systems based on sensor data). This allows system 10 to be driven semi-autonomously and/or allows system 10 to be driven autonomously without a human operator.

System 10 may include components 18. Components 18 may include seats in the interior of body 12, sensors, control circuitry, input-output devices, and/or other vehicle components. Control circuitry in system 10 may include one or more processors (e.g., microprocessors, microcontrollers, application-specific integrated circuits, etc.) and storage (e.g., volatile and/or non-volatile memory). Input-output devices in system 10 may include displays, sensors, buttons, light-emitting diodes and other light-emitting devices, haptic devices, speakers, and/or other devices for providing output and/or gathering environmental measurements and/or user input. The sensors may include ambient light sensors, touch sensors, force sensors, proximity sensors, optical sensors, capacitive sensors, resistive sensors, ultrasonic sensors, microphones, three-dimensional and/or two-dimensional image sensors, radio-frequency sensors, and/or other sensors. Output devices may be used to provide a user with haptic output, audio output, visual output (e.g., displayed content, light, etc.), and/or other suitable output.

During operation, control circuitry in system 10 may gather information from sensors (e.g., environmental sensors) and/or other input-output devices, may gather user input such as voice commands provided to a microphone, may gather a touch command supplied to a touch sensor, may gather button input supplied to one or more buttons, etc. Control circuitry in system 10 may use this input in driving system 10 and in controlling components in system 10. For example, the control circuitry can adjust electrically adjustable illumination sources such as windows with built-in illumination capabilities based on user input and/or environmental measurements. Windows with built-in illumination, which may sometimes be referred to as illuminated windows or adjustable-illumination windows, may have sources of illumination based on optically pumped photoluminescent material.

Windows in system 10 such as window 14 of FIG. 1 may, for example, include photoluminescent material 36. Pump light source 30 may produce pump light 32. Pump light 32 may be distributed within window 14 by a waveguide in window 14. When pump light 32 reaches material 36, material 36 will luminesce and produce corresponding visible output light 34. Light 34 may serve as interior illumination (light that illuminates interior region 20 of system 10) and/or may be emitted outwardly so that people in exterior region 22 may view light 34 and/or be illuminated by light 34. If desired, material 36 may be patterned to form icons, sign symbols (e.g., warning symbols such as stop sign symbols, etc.), characters such as letters (e.g., text), and/or other illuminated shapes viewable by occupants of system 10 and by nearby observers.

Material 36 may include a phosphor such as cerium-doped yttrium aluminum garnet (YAG) or other phosphor, photoluminescent nanoparticles (e.g., photoluminescent semiconductor particles), photoluminescent dyes, and/or other photoluminescent material. Material 36 may be provided in a blanket layer (e.g., a global layer covering substantially all of a window) or may cover only a portion of window 14 (e.g., 90% or less of window 14, 50% or less of window 14, 30% or less of window 14, at least 5% of window 14, at least 40% of window 14. etc. Material 36 may, for example, be formed in one or more areas (e.g., patches suitable shapes) that cover one or more subregions of a window while leaving remaining parts of the window free of photoluminescent material.

During operation, control circuitry in system 10 may, in response to detecting user commands, predetermined environmental conditions, or other conditions, adjust the amount of light being output by a source of pump light. The magnitude of the pump light determines the amount of visible-light luminescence produced by the pumped photoluminescent material. Window illumination may therefore be adjusted by adjusting the pump light source.

Window 14 may be flat (e.g., window 14 may lie in the X-Y plane of FIG. 1) or window 14 may have one or more curved portions. As an example, one or more portions of window 14 may be characterized by a curved cross-sectional profile and may have convex and/or concave exterior surfaces (and corresponding concave and/or convex interior surfaces). The area of each window 14 in system 10 may be at least 0.1 $m^2$, at least 0.5 $m^2$, at least 1 $m^2$, at least 5 $m^2$, at least 10 $m^2$, less than 20 $m^2$, less than 10 $m^2$, less than 5 $m^2$, or less than 1.5 $m^2$ (as examples).

Windows such as window 14 of FIG. 1 may be formed from one or more layers of transparent glass, clear polymer (e.g., adhesive, non-adhesive polymer films, etc.), and/or other layers. For example, a window may be formed from two glass layers or three glass layers laminated together with polymer. The glass layers may be chemically or thermally tempered (e.g., to create compressive stress on the surfaces of the glass layers).

Figure 2:
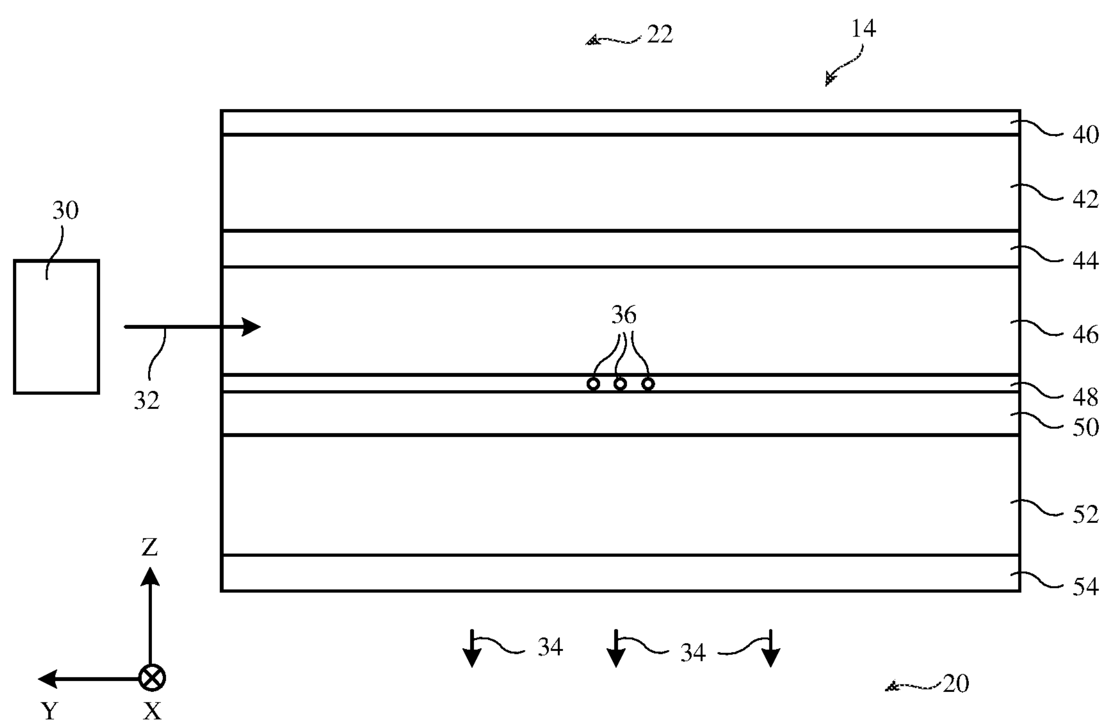
FIG. 2 is a cross-sectional side view of an illustrative window in accordance with an embodiment.

FIG. 2 is a cross-sectional side view of an illustrative window. In the illustrative configuration of FIG. 2, window 14 is formed from outer window layer 42 and inner window layer 52 (e.g., outer and inner structural glass layers and/or other layers of transparent material). The thicknesses of layers 42 and 52 may be, for example, 0.5 mm to 3 mm, at least 0.3 mm, at least 0.5 mm, less than 4 mm, less than 3 mm, or other suitable thickness.

An optical waveguide (sometimes referred to as a light guide layer, light guide, waveguide layer, waveguide, etc.) may be formed in window 14. The waveguide may include a waveguide core layer such as core 46 surrounded by cladding such as cladding layers 44 and 50. Core 46 may be formed from a layer of glass, polymer, or other suitable material. Cladding layers 44 and 50, which may be formed from polymer or other suitable material, may surround core 46 and may have refractive index value(s) that are lower than the refractive index value of core 46. With this arrangement, core 46 and cladding layers 44 and 50 form a waveguide that confines light 32 within core 46 in accordance with the principal of total internal reflection, thereby allowing light 32 to be distributed across window 14 within the X-Y plane (e.g., so that light 32 propagates in the −Y direction of FIG. 2 while spreading and mixing in the X dimension).

Photoluminescent material 36 may be incorporated into cladding layers 44 and/or 50, in core 46, or in one or more separate layers and/or other locations in the waveguide. In the example of FIG. 2, photoluminescent material 36 is included in polymer coating layer 48 (sometimes referred to as a phosphor layer or photoluminescent layer), which is interposed between core 46 and cladding layer 50. The refractive index of layer 48 may match (e.g., within 0.1, within 0.07, within 0.05, or within 0.03) the refractive index of layer 46 or that of layer 50 or the refractive index of layer 48 may have another suitable value (e.g., a value between that of core 46 and that of layer 50). In configurations in which photoluminescent material is doped into core 46 or incorporated into cladding layers 44 and 50, layer 48 may be omitted.

Cladding layers 44 and 50 (and, if desired, layer 48 and/or other layers in window 14) may be formed from polymer (sometimes referred to as polymer adhesive) that helps attach the structural layers of window 14 together. For example, consider an arrangement in which core 46 is formed from a layer of glass or polymer. In this type of arrangement, layers 44, 48, and 50 may be formed from polymer and may serve to attach layer 42 to the outwardly facing surface of layer 46 and to attach layer 52 to the opposing inwardly facing surface of layer 46.

Examples of polymers that may be used for forming core 46 and cladding layers 44 and 50 (and/or photoluminescent layer 48 and/or other polymer layers in window 14) include polycarbonate, acrylic, fluoropolymers, thermoplastic polyurethane, ethylene-vinyl acetate, and polyvinyl butyral (as examples). These polymers may be provided as liquid polymer material that is cured under application of light and/or heat and/or may be provided as preformed polymer films that are laminated into the transparent layers of window 14 during assembly.

Spectral filters such as filter layers 40 and 54 may be formed on the outwardly facing surface of layer 42 and the inwardly facing surface of layer 52, respectively. Filter layers 40 and 54, may, as an example, be filters configured to block (e.g., absorb and/or reflect) ultraviolet light and/or configured to block some or all of the visible light spectrum and/or infrared light spectrum. In an illustrative configuration, layers 40 and 54, which may sometimes be referred to as ultraviolet blocking layers, ultraviolet-light-blocking filters, or ultraviolet-light-blocking filter layers, may help prevent ultraviolet light from exterior 22 from reaching photoluminescent layer 48 (see, e.g., layer 40) and may help prevent any ultraviolet light that is present in pump light 32 from being emitted inwardly from the waveguide towards interior 20 (see, e.g., layer 54). Spectral filters may be provided using polymer that contains material that absorbs, reflects, and/or transmits light of desired wavelengths (e.g., dye, pigment, and/or other colorant), may include thin-film interference filter structures (e.g., a filter formed from a stack of organic and/or inorganic layers dielectric layers with appropriate thicknesses and refractive index layers to form a thin-film interference filter such as a stack of dielectric layers of alternating higher and lower refractive index values, etc.), and/or may include other filter structures (e.g., nano-imprinted ultraviolet light absorption structures for blocking ultraviolet light or other nano-scale features). Although shown as being located on the outermost surfaces of window 14 in the illustrative example of FIG. 2, filter layers 40 and/or 54 (and/or the filtering structures and/or materials that form such filters) may be located at any suitable locations within window 14 (e.g., between layers 42 and 44, between layers 50 and 52, between other transparent window layers, partly or fully within any one or more transparent window layers in window 14, etc.).

Outer window layer 42 may be formed from a single layer of structural window glass or may include multiple sublayers such as one or more layers of glass, optically clear adhesive, and/or polymer films. Inner window layer 52 may similarly be formed from a single layer of structural window glass or may include multiple sublayers such as one or more layers of glass, optically clear adhesive, and/or polymer films.

If desired, optional fixed and/or adjustable optical components may be incorporated into window 14 in addition to and/or in place of window layer(s) shown in FIG. 2. Such optional additional layers may be fixed and/or adjustable optical layers providing fixed and/or adjustable amounts of opacity, polarization, reflection, color cast, haze, and/or other optical properties. Configurations for window 14 in which such optional fixed and/or adjustable optical components are not present may sometimes be described herein as an example.

During operation, pump light source 30 produces pump light 32. Control circuitry in system 10 may be used to adjust pump light source 30 and therefore the magnitude of pump light 32. When it is desired to optically pump photoluminescent layer 48, source 30 is turned on and set to a desired intensity so that an appropriate amount of pump light 32 is supplied by source 30. Light 32 is conveyed to the photoluminescent material of layer 48 through the waveguide formed by core 46 and the cladding material surrounding core 46. When pump light 32 excites photoluminescent material 36, material 36 exhibits photoluminescence (e.g., material 36 luminesces and emits light 34). Emitted light 34 preferably includes visible light. Light 32 may be visible light (e.g., blue light or other visible light), ultraviolet light (e.g., ultraviolet light at a wavelength near the blue end of the visible light spectrum), and/or infrared light (in which case material 36 includes anti-Stokes phosphors and photoluminescence in material 36 is a non-linear two-photon or three-photon process). In an illustrative configuration, which may sometimes be described herein as an example, light 32 is ultraviolet and/or blue light and light 34 is visible light with a longer wavelength than light 32.

Photoluminescent emissions from material 36 tend to be omnidirectional (e.g., characterized by a uniform angular intensity distribution that is independent of the direction from which pump light 32 strikes materials 36). As a result, at least some of light 34 may be emitted in directions parallel (or nearly parallel) to the surface normal of window 14 (e.g., the Z axis in the example of FIG. 2). This helps to prevent retention of this portion of light 34 within window 14 due to total internal reflection and therefore helps allow this portion of light 34 to pass out of the waveguide efficiently (e.g., to illuminate interior 22).

Moreover, the use of photoluminescent layer 48 for producing illumination 34 may help maintain the level of haze for window 14 at a desired low level (e.g., below 2%, below 1.5%, below 1%, below 0.5%, below 0.25%, or other suitably low value). This is because it is not necessary to incorporate hazy visible light extraction features into window 14 to scatter light 32 in the −Z direction.

Pump light source 30 may be formed from one or more light-emitting devices such as light-emitting diodes and/or laser diodes. Pump light source 30 may, for example, include sets (one-dimensional arrays) of multiple light-emitting devices that extend along one or more of the edges of window 14. When light 32 is in the ultraviolet spectrum, light 32 will not be visible, which helps ensure that the output beams of individual light-emitting devices in pump 30 and the mixing of these beams in window 14 will not be visible along the edges of window 14. Due to the presence of filters 40 and 54, ultraviolet light from source 30 will be confined within the interior of window 14 and will therefore not expose occupants of system 10 or people in exterior 22.

The color of light 34 may be white or may have a non-white (non-neutral) color cast. As an example, layer 48 may contain yellow phosphor that causes light 34 to have a yellowish color cast. If white light output from window 14 is desired, some or all of the yellow color cast may be compensated (converted to pure white light or other light with less of a yellow color cast) by providing window 14 with a compensating blueish color cast (e.g., by incorporating blue colorant into one or more of the layers of window 14 and/or by configuring thin-film interference filter structures or other filter structures in filters such as filters 40 and/or 54 or other filter structures in window 14 to exhibit a bluish color cast). As an example, layer 48, filter 54, or other layer in window 14 (e.g., cladding layer 50, glass layer 52, etc.) may be provided with blue colorant (and/or a yellow-blocking thin-film interference filter structure) to help selectively block yellow light and thereby provide light 34 with a bluer (and therefore whiter and less yellow) color cast. In general, light 34 may have a warm tone (e.g., a yellowish appearance), a cold tone (e.g., a bluish appearance), a white appearance, and/or may have any other suitable color cast.

To help reduce visible light haze that might otherwise arise by allowing ambient visible light from exterior region 22 to pump layer 48, the photoluminescent material of window 14 may be configured to luminesce only under ultraviolet light illumination and not visible light illumination and/or a narrowband photoluminescent material may be used for layer 48. If desired, deep blue pump light (e.g., pump light at or near 400 nm in wavelength) may be used as pump light 32 and material 36 may be configured to luminesce only when pumped by deep blue pump light or ultraviolet light (thereby reducing undesired pumping by longer wavelength visible light).

Figure 3:
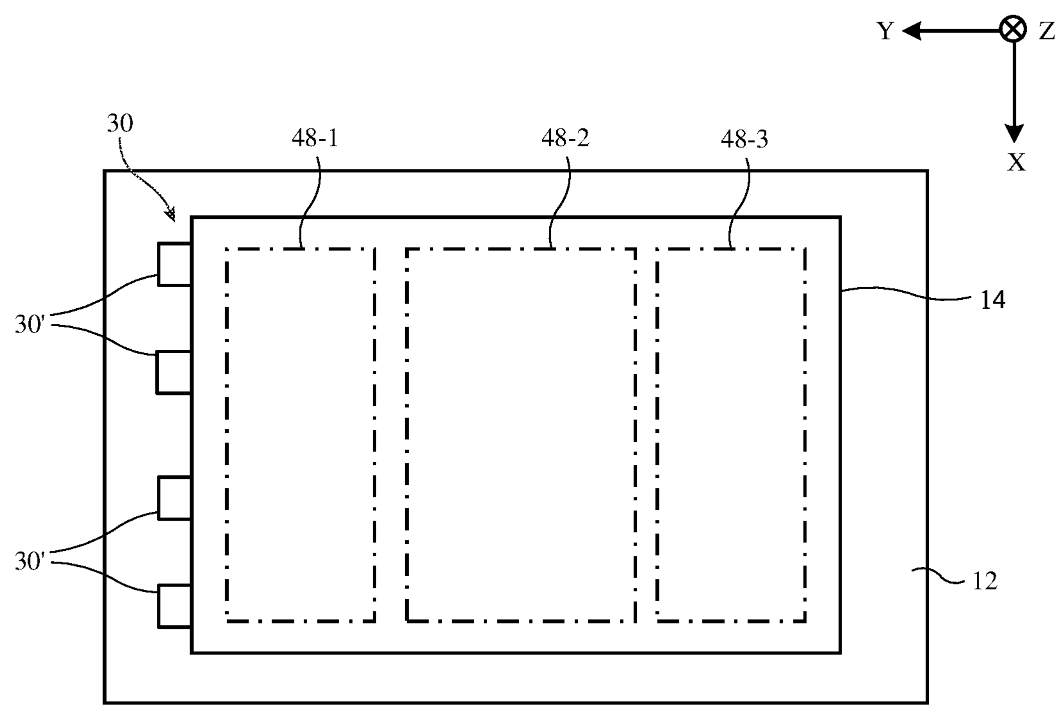
FIG. 3 is an interior view of an illustrative window in accordance with an embodiment.

If desired, more than one type of photoluminescent material may be used in window 14. This allows pump light sources 30 of different wavelengths to be used to selectively pump photoluminescent material in different respective areas of window 14. Consider, as an example, the top view of window 14 of FIG. 3. As shown in FIG. 3, window 14 may have three different areas of photoluminescent material 36 (e.g., a first area containing layer 48-1, a second area containing layer 48-2, and a third area containing layer 48-3). In this example, the first, second, and third areas do not overlap and are located in a row that extends along the Y axis away from pump light source 30.

Pump light source 30 contains multiple light-emitting devices 30' arranged along the edge of window 14. Devices 30' may contain light-emitting diodes and/or other light-emitting components that emit light of different wavelengths. Control circuitry in system 10 may adjust source 30 to adjust the spectrum of emitted light 32. In this way, different areas of window 14 may be caused to luminesce.

Each area of window 14 may have photoluminescent material with different pump light requirements. As an example, layer 48-1 may contain photoluminescent material that only luminesces under pump light of 350 nm or less, layer 48-2 may contain photoluminescent material that only luminesces under pump light of 370 nm or less (including 350 nm pump light), and layer 48-3 may contain photoluminescent material that only luminesces under pump light of 390 nm or less (including 370 nm and 350 nm pump light). Source 30 may contain individually controlled light-emitting diodes. Source 30 may, for example, contain first diodes that emit light at 350 nm, second diodes that emit light at 370 nm, and third diodes that emit light at 390 nm. By controlling which diodes in source 30 are activated, source 30 can produce pump light 32 at 350 nm, 370 nm, or 390 nm. When source 30 is directed to output 390 nm light, this light will pass the first and second areas without causing layers 48-1 or 48-2 to luminesce, but will successfully pump layer 48-3 in the third area and will therefore cause layer 48-3 in the third area to luminesce. Accordingly, in this first scenario, light 34 will be emitted from the third area and not from the first and second areas. When it is desired to emit light from the second and third areas, source 30 may be adjusted so that light 34 has a 370 nm wavelength. Pump light 32 of with wavelength will not cause layer 48-1 to luminesce but will cause both layers 48-2 and layer 48-3 to luminesce. Light 34 may be emitted from the first, second, and third areas of window 14 by adjusting source 30 to produce pump light 32 at 350 nm (thereby causing layers 48-1, 48-2, and 48-3 to luminesce).

As this example demonstrates, by using a tunable-wavelength pump light source 30 in window 14 and using photoluminescent material with different pump light energy requirements (maximum wavelength requirements) in different areas of window 14, the areas of window 14 that emit light 34 can by dynamically controlled. This allows chasing light effects and other dynamic visual effects to be produced, allows different areas of window 14 to be statically illuminated (e.g., so that different areas of interior 22 can be selectively provided with illumination 34), and/or otherwise allows the pattern of illumination 34 that is emitted by window 14 to be adjusted.

The foregoing is merely illustrative and various modifications can be made to the described embodiments. The foregoing embodiments may be implemented individually or in any combination.

What is claimed is:

1. A window configured to separate an interior region in a system from an exterior region surrounding the system, the window comprising:

first and second glass layers;

a waveguide interposed between the first and second glass layers and having a core surrounded by and in contact with cladding layers, wherein the core has a first refractive index and the cladding layers have a second refractive index that is lower than the first refractive index, and wherein the waveguide includes photoluminescent material doped into the core of the waveguide;

first and second ultraviolet-light-blocking filters, wherein the first and second glass layers are interposed between the first and second ultraviolet-light-blocking filters; and a pump light source coupled to an edge of the waveguide, wherein the pump light source is configured to emit pump light that causes the photoluminescent material to luminesce and emit light with a yellow color cast, and wherein one of the first and second ultraviolet-light-blocking filters is a thin-film interference filter that has a blue color cast to offset the yellow color cast.

2. The window defined in claim 1 wherein the core guides the pump light via total internal reflection and the cladding layers confine the pump light within the core.

3. The window defined in claim 2 wherein the pump light source is configured to emit the pump light to cause the photoluminescent material to emit the light into the interior.

4. The window defined in claim 3 wherein the pump light source is an ultraviolet pump light source.

5. The window defined in claim 3 wherein the cladding layers comprise a first cladding layer between the first glass layer and the core and a second cladding layer between the second glass layer and the core.

6. The window defined in claim 1 wherein the pump light source is an ultraviolet light pump source and wherein the first and second glass layers comprise outer and inner structural glass layers.

7. The window defined in claim 6 wherein the second ultraviolet-light-blocking filter is on the inner structural glass layer and is configured to prevent the pump light from reaching the interior.

8. The window defined in claim 6 wherein the first ultraviolet-light-blocking filter is on the outer structural glass layer and is configured to prevent ultraviolet ambient light in the exterior region from reaching the photoluminescent material.

9. The window defined in claim 1 further comprising blue colorant, wherein the photoluminescent material is configured to luminesce when pumped by the pump light to produce visible light illumination that has a color cast and wherein the blue colorant is configured to adjust the color cast of the visible light illumination as the visible light illumination passes from the photoluminescent material to the interior region.

10. A system, comprising:

a body;

a window in the body, wherein the body and the window separate an interior region from an exterior region, wherein the window contains a thin-film interference filter, a waveguide, and a polymer coating with photoluminescent material, wherein the thin-film interference filter is located on an outermost surface of the window facing the interior region, wherein the waveguide comprises a core surrounded by a cladding, and wherein the polymer coating is interposed between the core and the cladding and has a refractive index that matches a refractive index of one of: the core and the cladding; and an ultraviolet light source configured to emit ultraviolet light into the waveguide that pumps the photoluminescent material and causes the photoluminescent material to luminesce and provide visible light illumination to the interior region, wherein the visible light illumination has a yellowish color cast and wherein the thin-film interference filter comprises an ultraviolet-light-blocking filter having a blue color cast to compensate for the yellowish color cast.

11. The system defined in claim 10 wherein the window has a first glass layer and a second glass layer and wherein the waveguide is located between the first and second glass layers.

12. The system defined in claim 11 wherein the photoluminescent material comprises a layer of phosphor.

13. A window, comprising:

an outer glass layer;

an inner glass layer;

a waveguide between the outer glass layer and the inner glass layer, wherein the waveguide includes a core surrounded by cladding material, wherein the cladding material comprises photoluminescent material and is in contact with the core, wherein the photoluminescent material comprises a first photoluminescent material that is excited by a first range of ultraviolet wavelengths and a second photoluminescent material that is excited by a second range of ultraviolet wavelengths that is different from the first range of ultraviolet wavelengths;

a light source configured to emit ultraviolet pump light into the core, wherein the ultraviolet pump light is tunable between the first range of ultraviolet wavelengths and the second range of ultraviolet wavelengths, wherein the core guides the ultraviolet pump light to the photoluminescent material via total internal reflection, wherein the cladding material confines the ultraviolet pump light within the core, and wherein the ultraviolet pump light pumps the photoluminescent material so that the photoluminescent material emits visible light illumination that passes through the inner glass layer;

a first ultraviolet-light-blocking filter on the outer glass layer; and a second ultraviolet-light-blocking filter on the inner glass layer, wherein at least one of the first and second ultraviolet-light-blocking filters is a thin-film interference filter that has a blue color cast to offset a yellow color cast in the visible light illumination.

* * * * *

UNITED STATES PATENT AND TRADEMARK OFFICE

CERTIFICATE OF CORRECTION

PATENT NO. : 12,109,941 B1
APPLICATION NO. : 17/748946
DATED : October 8, 2024
INVENTOR(S) : Clarisse Mazuir and David E Kingman It is certified that error appears in the above-identified patent and that said Letters Patent is hereby corrected as shown below:

On the Title Page

Right Column, Item (57) Lines 7-8, “edges the waveguide” should read -- edges of the waveguide --

Signed and Sealed this
Seventeenth Day of December, 2024

Derrick Brent
*Acting Director of the United States Patent and Trademark Office*